D. F. Phillips,
Cider Mill.
N°8,549. Patented Nov. 25, 185
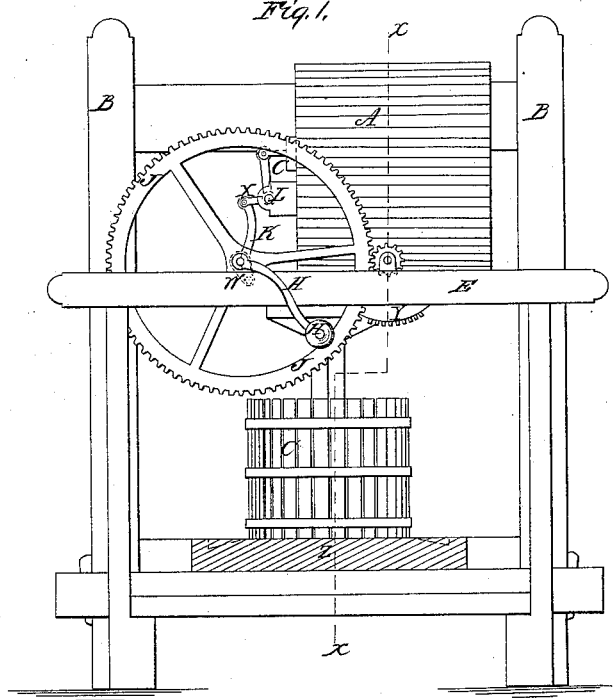
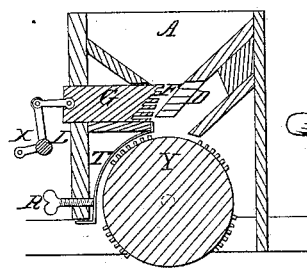
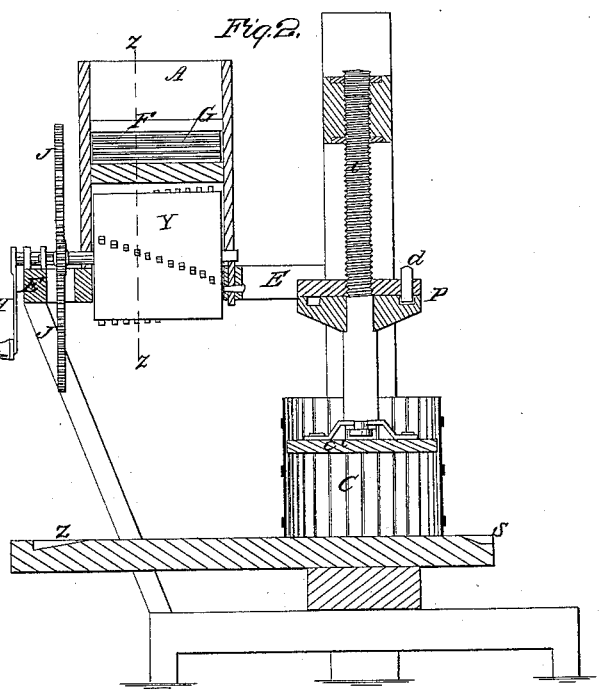
THE HELIOTYPE PRINTING CO. 220 DEVONSHIRE ST. BOSTON.

UNITED STATES PATENT OFFICE.

DAVID F. PHILLIPS, OF REPUBLIC, OHIO.

CIDER-MILL.

Specification of Letters Patent No. 8,549, dated November 25, 1851.

*To all whom it may concern:*

Be it known that I, DAVID F. PHILLIPS, of Republic, in the county of Seneca and State of Ohio, have invented a new and useful Improvement in Mills for Slicing and Grinding Apples for Making Cider, which I call the "Portable Cider-Mill"; and I do hereby declare the following to be a full and clear description thereof, reference being had to the annexed drawings, making part of this specification, viz:

Figure 1, is a front elevation. Fig. 2, is a section on the line $x\,x$ of Fig. 1. Fig. 3, is a section on the line $z\,z$ of Fig. 2, of the mill.

A, is a square box which serves as the hopper for the mill, near the center of this box is placed a set of knives seen in Fig. 3, which is a cross section of this box, showing the relative position of the knives at D and the follower G, which passes in through the front of the box and by means of parts hereafter described is made to move back and forward coming fully up to the edges of the knives and receding from them far enough to allow the apples to drop down between it and the knives; it will readily be perceived that the apples that fall between follower G and the knives D will, on its return be forced against the knives and be sliced into as many pieces as there are knives less one and that the slices will fall successively to the cylinder $y$, situated in the lower part of the box and which is furnished with small teeth set in spiral rows and a concave section or case T for grinding the sliced fruit. The knives should be so placed, that the spaces between any two shall be fully as wide between the backs of the blades as it is at the edges, otherwise each slice will crown and obstruct the working.

The front or cutting edges of the knives should be arranged in a straight line inclining back from the face of the follower at an angle of about 45 degrees with a horizontal plane, the lowermost knife being nearest the follower and the knives being of the same size of course the backs will incline at the same angle, so that as the slices of apples are forced between the knives the pieces that pass between the two lower knives will fall to the periphery of the grinding cylinder first and the slices that are forced between the two upper knives will descend to the cylinder last by which arrangement the spiral rows of teeth on the cylinder will be made to act upon the slices of apples in succession causing them to be ground into pomace more effectually than by the old mode of grinding the apples without previously slicing them, as they descend from the hopper directly upon the surface of the grinding cylinder. The distance at which the knives should be placed apart must be regulated by the required thickness of the slices. The face of the follower is grooved in such manner as to form ribs or plates F of different degrees of projection, the lowermost rib projecting the most from the end of the follower for passing between the knives to force the slices of apples through the spaces between the knives and prevent them from becoming clogged. The slices of apples having been reduced to pomace by the cylinder and concave, the pomace falls into the movable curb placed beneath the cylinder and when the curb is filled it is removed to the press and an empty curb put in its place and filled in the same manner, so that there will always be a curb beneath the grinding cylinder and one under the pressing screw at the same time.

The curb C is made with iron hoops and staves of wood, each stave being riveted to the hoops so as to leave a small space between each to allow the fluid or cider to pass through, but close enough to retain the pomace. Into this curb is fitted a follower to pass freely up and down; this is attached to the screw O by the plate and collar seen at $C^1$.

E E are parts of the frame which support the mill.

In front of the box or hopper A is seen the end of the follower G: This is connected by a rod or pitman to the arm of a small shaft L, which is supported in two ears or bearings on the sides of the box and which shaft has another arm X connected to a small crank W on the end of the main shaft by the pitman K. This main shaft carries the cog-wheel J which gears into the pinion on the shaft of the grinding cylinder and turns the cylinder. On the nearest end of the shaft is seen the crank H, by which the machine is put in motion.

To use this mill, I first place the curb under the cylinder and then place the apples in the hopper and by turning the shaft of wheel J cause the cylinder A to turn and at the same time the small crank on the farther end of the shaft puts in motion the rocking shaft L, which moves the follower G. The apples descend to the knives and are pushed through the spaces between them by the follower and are thus reduced to slices which descend to the cylinder where they are reduced to pomace.

The thumb screw R seen at Fig. 3 is made to press more or less against the lower part of the concave section and thereby set it closer to the cylinder when required to grind fine. This concave should move freely on two broad short tenons formed on its ends resting in grooves in the sides of the box.

To express the cider from the pomace it is only necessary to move the lever to the left and this will cause the screw to turn in the same direction and the follower attached to its lower end to descend upon the pomace in the curb and compress it.

The circular collar P is divided horizontally into two equal parts—the lowermost one is fixed to the screw and the upper one forms part of the lever and turns upon the lower part and when the two are locked together by the dog $d$ which passes loosely through the upper plate and enters a notch in the lower plate, they will turn together in the same direction. The lower end of this dog is made beveling so that by changing its position the direction of the turning of the screw may be changed. It will of course be understood that the juice expressed from the pomace will run through the space between the staves into the trough in the platform Z, being conducted thence to the tub or receiver through the spout S.

Having thus described the portable cider mill I wish it to be understood, that I make no claim to originality of invention to any part of the mill separately considered; nor do I claim as new any part of the arrangement of the press, grinding cylinder, or hopper; but

What I do claim as new is:

The arrangement of the parallel slicing knives D in combination with the reciprocating follower G made as described with channels and ribs on its inclined face when used with a grinding cylinder Y and concave T made and arranged as described and represented for first slicing the apples and then delivering the slices successively to the grinding cylinder Y to be reduced to pomace in the manner herein described.

In testimony whereof I have hereunto signed my name before two subscribing witnesses.

D. F. PHILLIPS.

Witnesses:
WM. P. ELLIOT,
J. Y. PHILLIPS.